US012474033B1

(12) United States Patent
Wang

(10) Patent No.: US 12,474,033 B1
(45) Date of Patent: Nov. 18, 2025

(54) SNAP-FIT BUBBLE LAMP

(71) Applicant: DONGGUAN HUIHUAN LIGHTING CO., LTD, Dongguan (CN)

(72) Inventor: Song Wang, Chengdu (CN)

(73) Assignee: DONGGUAN HUIHUAN LIGHTING CO., LTD, Dongguan (CN)

(*) Notice: Subject to any disclaimer, the term of this patent is extended or adjusted under 35 U.S.C. 154(b) by 0 days.

(21) Appl. No.: 19/174,444

(22) Filed: Apr. 9, 2025

(30) Foreign Application Priority Data

Mar. 28, 2025 (CN) ........................ 202520570525.2

(51) Int. Cl.

*F21V 17/16* (2006.01)
*F21S 10/00* (2006.01)
*F21V 19/00* (2006.01)
*F21V 29/90* (2015.01)
*F21V 31/00* (2006.01)

(52) U.S. Cl.

CPC .......... *F21V 17/164* (2013.01); *F21S 10/002* (2013.01); *F21V 19/006* (2013.01); *F21V 29/90* (2015.01); *F21V 31/005* (2013.01)

(58) Field of Classification Search

CPC ......... F21S 6/001; F21S 10/002; F21V 17/06; F21V 17/16–18; F21V 9/12; F21V 17/164; F21V 17/14; A47G 2033/0827; A47G 33/0809; A47G 33/0836; G09F 13/24

See application file for complete search history.

(56) References Cited

U.S. PATENT DOCUMENTS 4,011,444 A * 3/1977 Levy ....................... F21S 6/001 362/362
2017/0356607 A1* 12/2017 Lin ....................... F21S 10/002
2024/0191851 A1* 6/2024 Li ............................ F21V 29/90
2024/0295235 A1* 9/2024 Cummings ........... F21V 21/116

FOREIGN PATENT DOCUMENTS

CN 202040619 U * 11/2011
CN 211952284 U * 11/2020

OTHER PUBLICATIONS

Machine translation of CN202040619U, retrieved from worldwide.espacenet.com on Jun. 10, 2025 (Year: 2025).*
Machine translation of CN211952284U, retrieved from worldwide.espacenet.com on Jun. 10, 2025 (Year: 2025).*

* cited by examiner

*Primary Examiner* — Abdulmajeed Aziz
*Assistant Examiner* — Steven Y Horikoshi
(74) *Attorney, Agent, or Firm* — AVEK IP, LLC

(57) ABSTRACT

The disclosure provides embodiments of snap-fit bubble lamps. In some examples, a snap-fit bubble lamp includes a decorative shell, a heating light source, and a bubble tube. The decorative shell includes an upper shell body and a lower shell body in snap fit with the upper shell body, and has a top end formed with a first opening and a bottom end formed with a second opening. The heating light source is mounted in the second opening and includes a threaded lamp base, a lamp shade, and a heating filament. The bubble tube is mounted in the first opening. The heating light source transfers heat to the bubble tube to generate bubbles in the bubble tube. The decorative shell is assembled by snap fit, and the assembly structure is simplified, thus reducing the production cost and making the decorative shell detachable and reusable.

8 Claims, 5 Drawing Sheets

SNAP-FIT BUBBLE LAMP

BACKGROUND OF THE INVENTION

1. Technical Field

The disclosure relates to the technical field of lamps, in particular to snap-fit bubble lamps.

2. Description of Related Art

Bubble LED lamps, as one type of main outdoor decorative lamps, are widely applied to various gathering places. To facilitate the installation of a heating light source inside the bubble LED lamps, a decorative shell of existing bubble LED lamps is typically formed from an upper shell body and a lower shell body and is traditionally assembled by ultrasonic welding. Although the decorative shell assembled in this way is firm and unlikely to crack, the assembly process cost is high, and the decorative shell is nondetachable. In view of this, the inventor makes a further improvement on existing bubble LED lamps.

BRIEF SUMMARY OF THE INVENTION

In view of the defects in the prior art, the goal of the disclosure is to provide a snap-fit bubble lamp, which has the characteristic of low cost.

Some embodiments of the disclosure provide a snap-fit bubble lamp, including a decorative shell, a heating light source and a bubble tube. The bubble tube has a flat bottom end, the decorative shell includes an upper shell body and a lower shell body in snap fit with the upper shell body, a first opening is formed in a top end of the decorative shell, and a second opening is formed in a bottom end of the decorative shell. The heating light source includes a threaded lamp base, a lamp shade and a heating filament, the threaded lamp base is connected to the lamp shade, the heating filament is arranged inside the lamp shade, the heating light source is mounted in the second opening, and the threaded lamp base extends out of the second opening. The bubble tube is mounted in the first opening and extends out of the first opening. The heating light source is in contact with the bubble tube or a limited gap is formed between the heating light source and the bubble tube, such that heat is transferred from the heating light source to the bubble tube to generate bubbles in the bubble tube.

Optionally, an assembly portion extends downwards from a bottom end of the upper shell body, and a first convex ring is arranged at an outer end of the assembly portion; and a second convex ring is arranged on an inner wall of the lower shell body, and the first convex ring is clamped on the second convex ring.

Optionally, a group of positioning pillars are symmetrically arranged on the assembly portion, and positioning grooves corresponding to the positioning pillars are formed in the lower shell body.

Optionally, a first periphery is arranged at a top end of the lower shell body, a second periphery corresponding to the first periphery is arranged on the upper shell body, and the first periphery and the second periphery abut against each other to seal the decorative shell.

Optionally, multiple elastic abutting portions used for fixing the bubble tube extend outwards from the first opening, and the elastic abutting portions are distributed around the bubble tube at intervals.

Optionally, abutting ribs are arranged on middle portions of the elastic abutting portions.

Optionally, multiple L-shaped extension blocks extend downwards from the elastic abutting portions, and a receiving space for receiving the bubble tube is defined by the multiple L-shaped extension blocks.

Optionally, the bubble tube is a glass tube and sealed, and a low-boiling point liquid is injected into the bubble tube.

Optionally, a catalyst layer for assisting the low-boiling point liquid in generating bubbles is arranged at the bottom end of the bubble tube.

Optionally, a plurality of decorative holes are formed in the upper shell body and the lower shell body.

Figure 1:
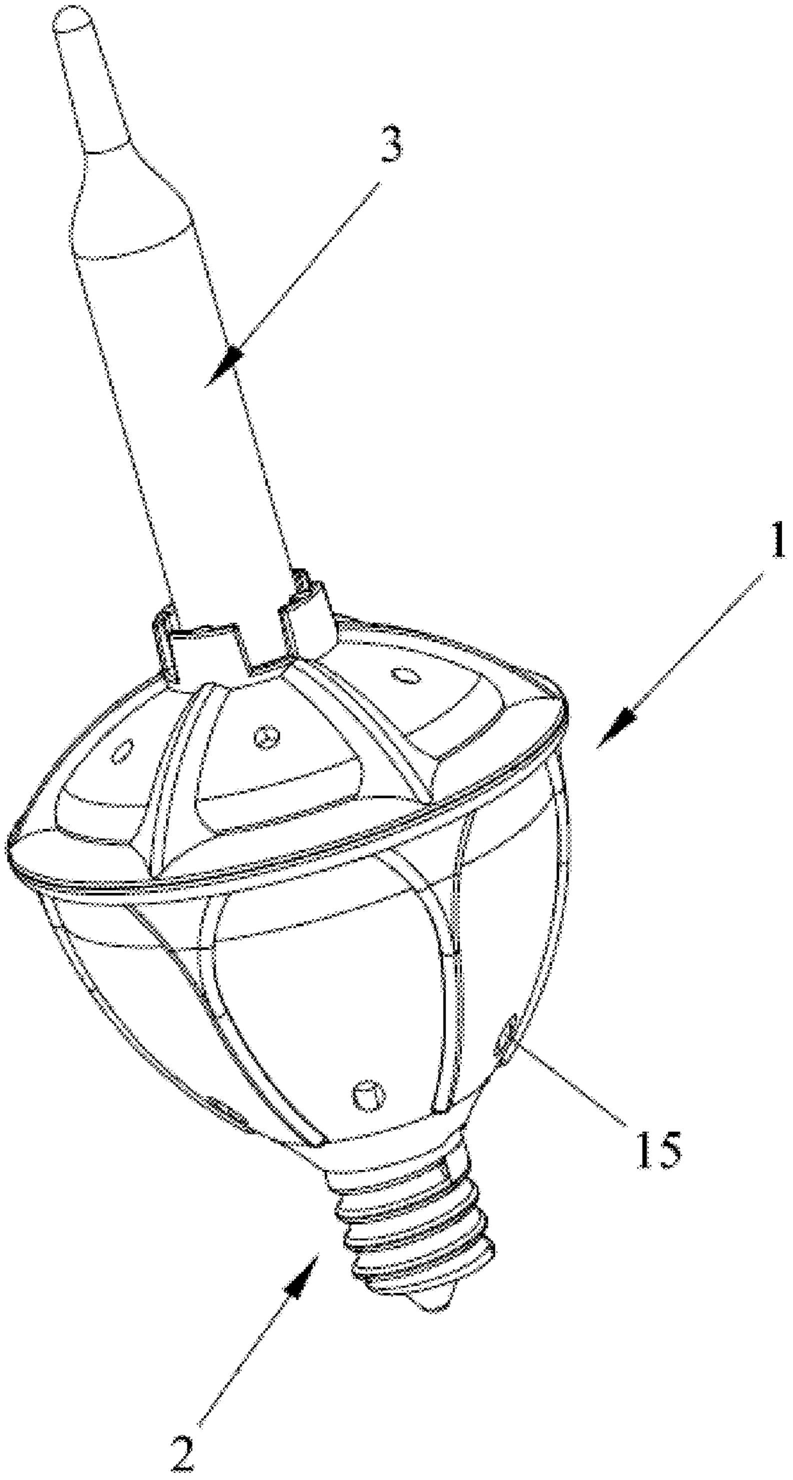
FIG. 1 is an overall structural view according to an embodiment of the disclosure.
Figure 2:
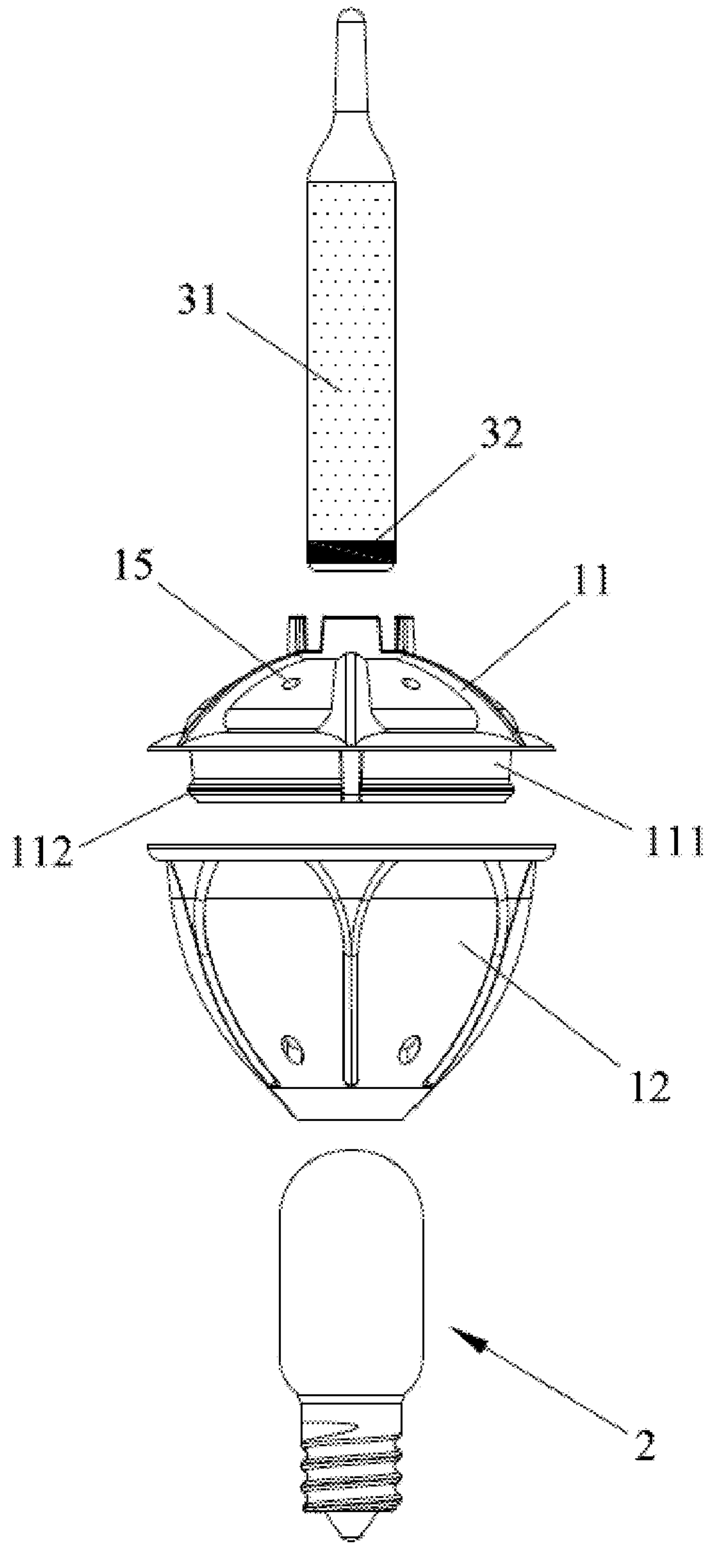
FIG. 2 is an exploded structural view to an embodiment of the disclosure.
Figure 3:
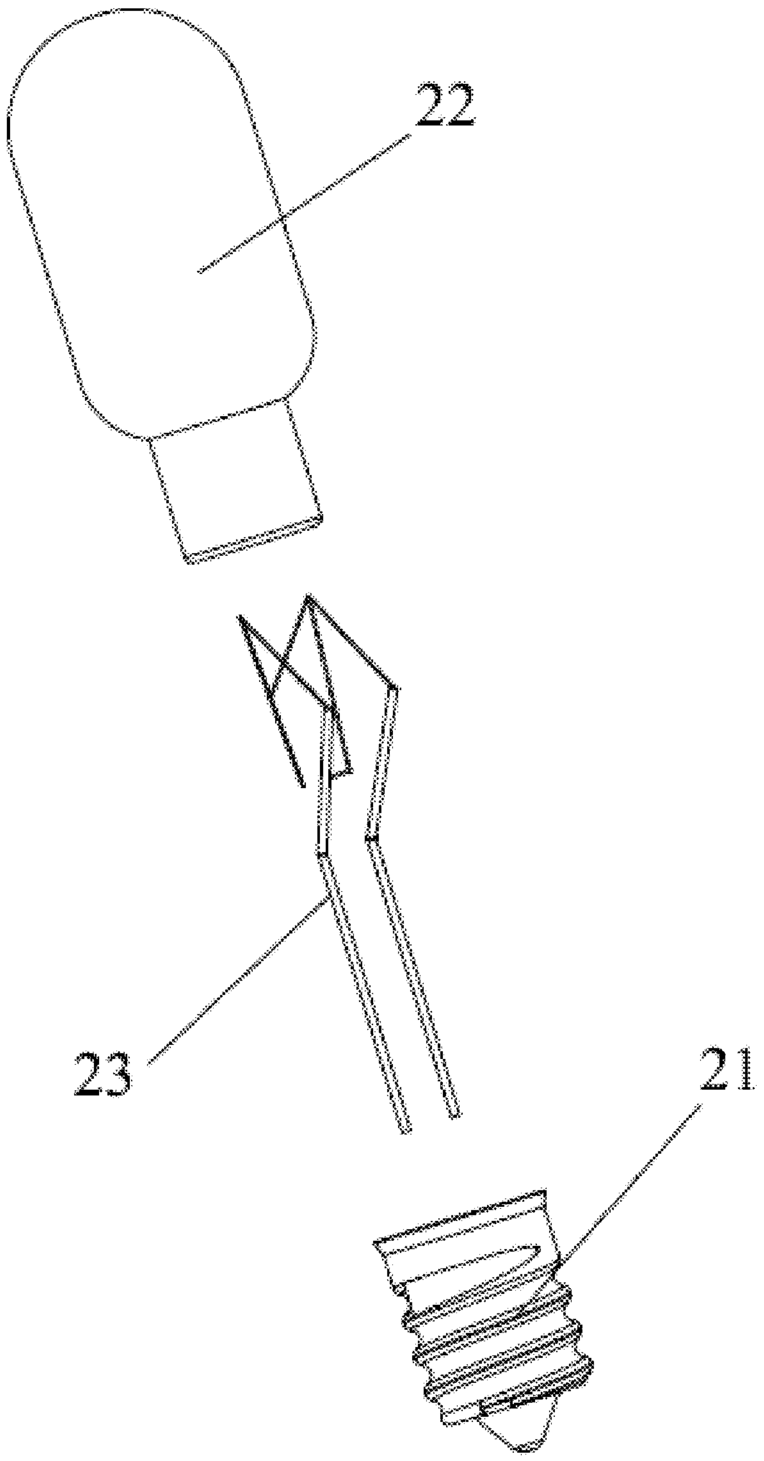
FIG. 3 is a structural view of a heating light source to an embodiment of the disclosure.
Figure 4:
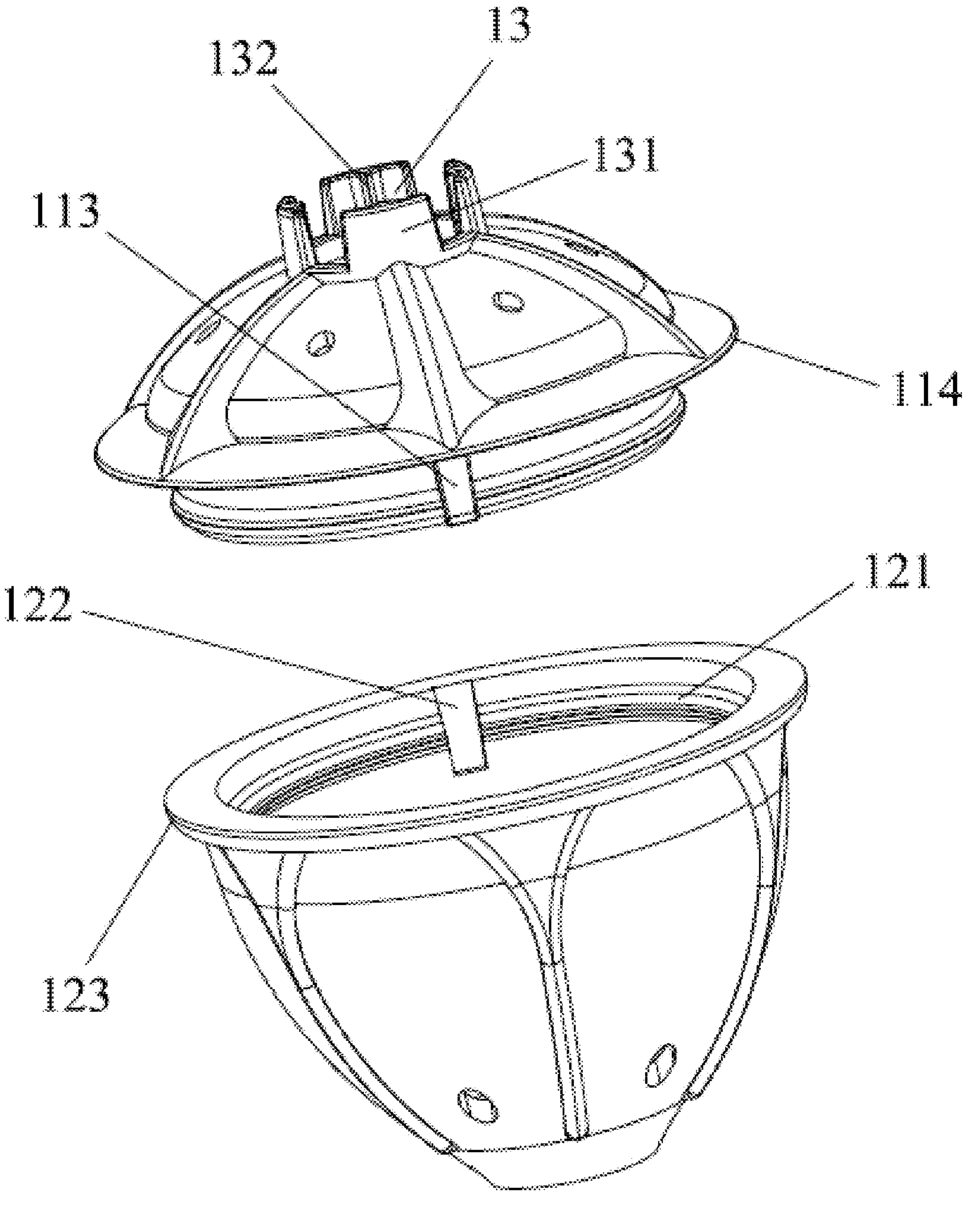
FIG. 4 is an exploded structural view of a decorative shell to an embodiment of the disclosure.

Reference numerals: 1, decorative shell; 11, upper shell body; 111, assembly portion; 112, first convex ring; 113, positioning pillar; 114, second periphery; 12, lower shell body; 121, second convex ring; 122, positioning groove; 123, first periphery; 13, first opening; 131, elastic abutting portion; 132, abutting rib; 133, L-shaped extension block; 134, receiving space; 14, second opening; 15, decorative hole; 2, heating light source; 21, threaded lamp base; 22, lamp shade; 23, heating filament; 3, bubble tube; 31, low-boiling point liquid; and 32, catalyst layer.

DETAILED DESCRIPTION OF THE INVENTION

The disclosure is described in detail below in conjunction with FIGS. 1-5.

The disclosure provides a snap-fit bubble lamp, which as shown in FIG. 1, may include a decorative shell 1, a heating light source 2 and a bubble tube 3. The bubble tube 3 has a flat bottom end. The decorative shell 1 may include an upper shell body 11 and a lower shell body 12 in snap fit with the upper shell body 11, a first opening 13 is formed in a top end of the decorative shell 1, and a second opening 14 is formed in a bottom end of the decorative shell 1. The heating light source 2 may include a threaded lamp base 21, a lamp shade 22 and a heating filament 23. The threaded lamp base 21 is connected to the lamp shade 22, the heating filament 23 is arranged inside the lamp shade 22, the heating light source 2 is mounted in the second opening 14, and the threaded lamp base 21 extends out of the second opening 14. The buttle tube 3 is mounted in the first opening 13 and extends out of the first opening 13. The heating light source 2 is generally a tungsten bulb capable of producing more heat, and the heating light source 2 is in contact with the bubble tube 3 or a limited gap is formed between the heating light source 2 and the bubble tube 3, such that heat is transferred from the heating light source 2 to the bubble tube 3 to generate bubbles in the bubble tube 3. The heating light source 2 produces heat, transfers heat to the bubble tube 3 and drives bubbles to be generated in the bubble tube 3, and light emitted by the heating light source 2 is diffused by the transparent bubble tube 3 to form a bubble lamp. The disclosure improves existing bubble LED lamps, the decorative shell 1 is assembled by snap fit rather than high-cost ultrasonic welding, and the assembly structure is simplified, thus significantly reducing the production cost of the lamp and making the decorative shell 1 detachable and reusable.

According to an embodiment of the disclosure, an assembly portion 111 extends downwards from a bottom end of the upper shell body 11, and a first convex ring 112 is arranged at an outer end of the assembly portion 111. A second convex ring 121 is arranged on an inner wall of the lower shell body 12, the assembly portion 111 is placed in the lower shell body 12, and the first convex ring 112 is pressed into the bottom of the second convex ring to be clamped on the second convex ring 121, such that the upper shell body 11 and the lower shell body 12 are firmly assembled together. By adopting such a structure, the upper shell body 11 and the lower shell body 12 may be firmly assembled, and the assembly structure of the lamp may be simplified to the maximum extent, thus reducing the forming cost.

To improve the assembly efficiency of the lamp, a group of positioning pillars 113 are symmetrically arranged on the assembly portion 111, and positioning grooves 122 corresponding to the positioning pillars are formed in the lower shell body 12.

In this technical solution, a first periphery 123 is arranged at a top end of the lower shell body 12, a second periphery 114 is arranged at an outer end of the assembly portion 111 of the upper shell body 11, and the first periphery 123 and the second periphery 114 abut against each other and seal the decorative shell 1 to improve the sealing performance of the decorative shell 1, thus preventing the shell from being easily disassembled with an external force.

To fix and position the bubble tube 3, multiple elastic abutting portions 131 extend outwards from the first opening 13 and are distributed around the bubble tube 3 at intervals. The bubble tube 3 is squeezed by the elastic abutting portions 131 to be fixed.

As a further improvement of the technical solution, abutting ribs 132 are arranged on middle portions of the elastic abutting portions 131. The abutting ribs 132 not only improve the strength of the elastic abutting portions 131, but also reduce gaps between the elastic abutting portions 131 and the surface of the bubble tube 3, thus improving the abutting effect of the elastic abutting portions.

Figure 5:
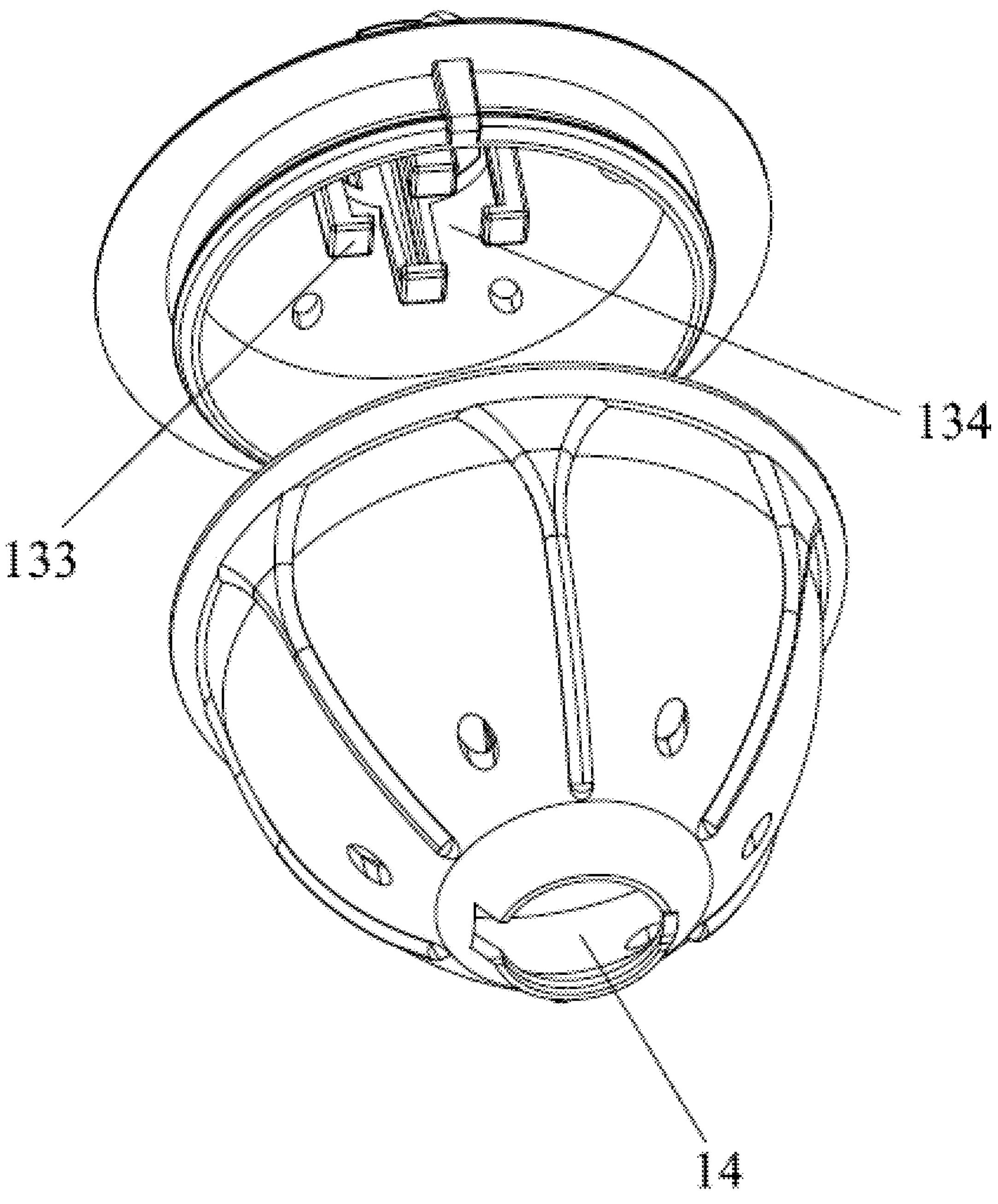
FIG. 5 is a structural view of a receiving space to an embodiment of the disclosure.

Optionally, as shown in FIG. 5, multiple L-shaped extension blocks 133 extend downwards from the elastic abutting portions 131, and a receiving space 134 for receiving the bubble tube 3 is defined by the multiple L-shaped extension blocks 133. The receiving space 134 works together with the abutting force of the elastic abutting portions above to stably assemble the bubble tube 3 in the first opening 13 of the decorative shell 1.

According to an embodiment of the disclosure, the bubble tube 3 is a glass tube and sealed, and a low-boiling point liquid 31 is injected into the bubble tube 3. The sealed glass tube has good heat conductivity, such that the low-boiling point liquid 31 reaches the boiling point and boils more easily to generate bubbles. The low-boiling point liquid 31 may be dichloromethane.

Optionally, to ensure that bubbles are continuously generated in the bubble tube 3 as quickly as possible after the lamp is turned on, a catalyst layer is arranged at the bottom end of the bubble tube 3. The catalyst layer 32 may be a mixture of sodium silicate and glass splinters. The catalysis principle of the catalyst layer 32 is as follows: when the glass splinters are fixed at the bottom of the inside of the bubble tube 3 by means of the sodium silicate, gaps of different sizes will be formed; and when the low-boiling point liquid 31 is heated to boil, bubbles will be divided by the irregular gaps to form more small bubbles, such that a larger number of more obvious bubble flows are generated in the bubble tube 3.

Optionally, a plurality of decorative holes 15 are formed in the upper shell body 11 and the lower shell body 12. The plurality of decorative holes 15 formed around the decorative shell 1 not only has the function of decorating and beautifying the lamp, but also function as heat-dissipation holes of the lamp to prevent excess heat of the heating light source 2 from being accumulated in the decorative shell 1.

Various embodiments of the disclosure may have one or more of the following effects. Compared with the prior art, some embodiments of the snap-fit bubble lamp provided by includes a decorative shell, a heating light source and a bubble tube, the decorative shell includes an upper shell body and a lower shell body in snap fit with the upper shell body, a first opening is formed in a top end of the decorative shell, and a second opening is formed in a bottom end of the decorative shell; and the disclosure improves existing bubble LED lamps, the decorative shell is assembled by snap fit rather than high-cost ultrasonic welding, and the assembly structure is simplified, thus significantly reducing the production cost of the lamp and making the decorative shell detachable and reusable.

The above embodiments are merely preferred ones of the disclosure. Those ordinarily skilled in the art may make some modifications to the specific implementation and application range of the disclosure according to the concept of the disclosure. The description here should not be construed as limiting the disclosure.

The disclosure claimed is:

1. A snap-fit bubble lamp, comprising a decorative shell (1), a heating light source (2) and a bubble tube (3), wherein:

the bubble tube (3) has a flat bottom end, the decorative shell (1) comprises an upper shell body (11) and a lower shell body (12) in snap fit with the upper shell body (11), a first opening (13) is formed in a top end of the decorative shell (1), and a second opening (14) is formed in a bottom end of the decorative shell (1);

the heating light source (2) comprises a threaded lamp base (21), a lamp shade (22) and a heating filament (23), the threaded lamp base (21) is connected to the lamp shade (22), the heating filament (23) is arranged inside the lamp shade (22), the heating light source (2) is mounted in the second opening (14), and the threaded lamp base (21) extends out of the second opening (14);

the bubble tube (3) is mounted in the first opening (13) and extends out of the first opening (13);

the heating light source (2) is in contact with the bubble tube (3) or a limited gap is formed between the heating light source (2) and the bubble tube (3), such that heat is transferred from the heating light source (2) to the bubble tube (3) to generate bubbles in the bubble tube (3);

multiple elastic abutting portions (131) used for fixing the bubble tube (3) extend outwards from the first opening (13), and the elastic abutting portions (131) are distributed around the bubble tube (3) at intervals; and multiple L-shaped extension blocks (133) extend downwards from the elastic abutting portions (131), and a receiving space (134) for receiving the bubble tube (3) is defined by the multiple L-shaped extension blocks (133).

2. The snap-fit bubble lamp according to claim 1, wherein: an assembly portion (111) extends downwards from a bottom end of the upper shell body (11), and a first convex ring (112) is arranged at an outer end of the assembly portion (111); and a second convex ring (121) is arranged on an inner wall of the lower shell body (12), and the first convex ring (112) is clamped on the second convex ring (121).

3. The snap-fit bubble lamp according to claim 2, wherein: a group of positioning pillars (113) are symmetrically arranged on the assembly portion (111), and positioning grooves (122) corresponding to the positioning pillars are formed in the lower shell body (12).

4. The snap-fit bubble lamp according to claim 2, wherein: a first periphery (123) is arranged at a top end of the lower shell body (12), a second periphery (114) corresponding to the first periphery (123) is arranged on the upper shell body (11), and the first periphery (123) and the second periphery (114) abut against each other to seal the decorative shell (1).

5. The snap-fit bubble lamp according to claim 1, wherein abutting ribs (132) are arranged on middle portions of the elastic abutting portions (131).

6. The snap-fit bubble lamp according to claim 1, wherein: the bubble tube (3) is a glass tube and sealed, and a low-boiling point liquid (31) is injected into the bubble tube (3).

7. The snap-fit bubble lamp according to claim 6, wherein a catalyst layer (32) for assisting the low-boiling point liquid (31) in generating bubbles is arranged at the bottom end of the bubble tube (3).

8. The snap-fit bubble lamp according to claim 1, wherein a plurality of decorative holes (15) are formed in the upper shell body (11) and the lower shell body (12).

* * * * *